US009963866B2

(12) United States Patent
Nemec

(10) Patent No.: US 9,963,866 B2
(45) Date of Patent: May 8, 2018

(54) DRAIN DEVICE

(71) Applicant: ACO Severin Ahlmann GmbH & Co. Kommanditgesellschaft, Büdelsdorf (DE)

(72) Inventor: Ivo Nemec, Nizkov (CZ)

(73) Assignee: ACO SEVERIN AHLMANN GMBH & CO. KG, Buedelsdorf (DE)

( * ) Notice: Subject to any disclaimer, the term of this patent is extended or adjusted under 35 U.S.C. 154(b) by 20 days.

(21) Appl. No.: 14/906,360

(22) PCT Filed: Jul. 16, 2014

(86) PCT No.: PCT/EP2014/065238
§ 371 (c)(1),
(2) Date: Jan. 20, 2016

(87) PCT Pub. No.: WO2015/010989
PCT Pub. Date: Jan. 29, 2015

(65) Prior Publication Data
US 2016/0160488 A1    Jun. 9, 2016

(30) Foreign Application Priority Data

Jul. 23, 2013   (DE) .................. 10 2013 107 840

(51) Int. Cl.
*E03F 5/04*   (2006.01)
(52) U.S. Cl.
CPC .... *E03F 5/0408* (2013.01); *E03F 2005/0413* (2013.01); *Y02A 30/68* (2018.01); *Y10T 137/5762* (2015.04)
(58) Field of Classification Search
CPC . E03F 5/0408; E03F 5/10; E03F 5/042; E03F 5/047; Y10T 137/5762
See application file for complete search history.

(56) References Cited

U.S. PATENT DOCUMENTS 2,607,434 A * 8/1952 Sisk ............... E03F 5/0407
210/165
2,695,073 A * 11/1954 Sisk ............... E03F 5/0407
210/165
(Continued)

FOREIGN PATENT DOCUMENTS

EP    0959203 A2    11/1999
EP    1818464 B1    8/2007
(Continued)

OTHER PUBLICATIONS

The Written Opinion and International Search report issued in International Patent Application No. PCT/EP2014/065238; dated Oct. 2, 2014.
The Notification of First Office Action and Translation of the First Office Action issued in corresponding Chinese Application No. 2014800414467 dated Sep. 23, 2016.

*Primary Examiner* — Craig Schneider
*Assistant Examiner* — Kevin Barss
(74) *Attorney, Agent, or Firm* — Pearne & Gordon LLP

(57) ABSTRACT

The invention relates to a drain device (5) for discharging waste water, having an upper edge surface (65) forming an outer perimeter of the drain device (5), a support surface (40) for supporting a cover member such that essentially, the walkable surface thereof extends flush with the upper edge surface (65), and having a bottom (10) for catching, and for conveying waste water to an opening (82) of an outflow connecting pipe (80). The upper edge surface (65), the support surface (40), and the bottom (10) are connected to one another by way of connection walls (25, 50) extending essentially vertically when in use. At least one part of the support surface (40) is formed in a sloping manner in the direction of the bottom (10) such that during use, waste water, which reaches the support surface (40), flows in the direction of the bottom (10).

10 Claims, 6 Drawing Sheets

(56) References Cited

U.S. PATENT DOCUMENTS

| | | | | |
|---|---|---|---|---|
| 2,695,677 A | * | 11/1954 | Sisk | E03F 5/0407 |
| | | | | 210/165 |
| 2,695,678 A | * | 11/1954 | Sisk | E03F 5/0407 |
| | | | | 210/165 |
| 2,777,532 A | * | 1/1957 | Sisk | B63B 13/00 |
| | | | | 210/165 |
| 2,779,430 A | * | 1/1957 | Sisk | E03F 5/0407 |
| | | | | 210/165 |
| 2,783,852 A | * | 3/1957 | Sisk | E03F 5/0408 |
| | | | | 210/165 |
| 2,898,129 A | | 8/1959 | Sisk et al. | |
| 3,606,617 A | * | 9/1971 | Frazier | A47K 3/40 |
| | | | | 4/613 |
| 6,131,897 A | * | 10/2000 | Barz | B62D 29/002 |
| | | | | 269/207 |
| 6,311,452 B1 | * | 11/2001 | Barz | B62D 29/002 |
| | | | | 296/207 |
| 6,990,695 B2 | * | 1/2006 | Grayson | A47K 3/40 |
| | | | | 4/612 |
| 2008/0222891 A1 | * | 9/2008 | Cook | A47K 3/40 |
| | | | | 29/890.141 |
| 2012/0036697 A1 | * | 2/2012 | Cook | E03F 5/0407 |
| | | | | 29/428 |

FOREIGN PATENT DOCUMENTS

| | | |
|---|---|---|
| FR | 2296113 A1 | 7/1976 |
| GB | 2282156 A | 3/1995 |
| JP | 2000265534 A | 9/2000 |
| JP | 2003013485 A | 1/2003 |
| RU | 2435910 C2 | 12/2011 |
| SE | 306062 B | 11/1968 |

\* cited by examiner

DRAIN DEVICE

The invention relates to a drain device according to claim 1.

A plurality of drain devices for disposing of waste water is known. One problem with the drain devices known so far is that waste water accumulates, or remains, on various surfaces of the drain device, in particular on a support surface for supporting a cover element. Instead of running off, waste water remaining on the surfaces for any amount of time evaporates. As a result, the humidity is increased and the evaporated waste water leaves residue on the surfaces of the drain device. This leads to an increased cleaning work and increased cleaning costs. Furthermore, bacteria reproduce very quickly in the waste water remaining on the surfaces. This endangers the health of people who come in contact with the waste water remaining on the surfaces, or who inhale the waste water evaporated after some time.

The invention addresses the problem of identifying a drain device preventing in a technically simple manner, waste water from remaining or persisting for any period of time, on surfaces of the drain device.

This problem is solved by a drain device according to claim 1.

The problem is solved in particular by means of a drain device for draining waste water, comprising an upper rim surface, which forms an outer perimeter of the drain device, a support surface for supporting a cover element, such that its walk-on surface extends substantially flush with the upper rim surface, and a bottom for accumulating and conveying waste water into an opening in an outlet, wherein the upper rim surface, the support surface and the bottom are interconnected in use by connecting walls that run substantially vertical when in use, wherein at least a portion of the support surface is sloped downward toward the bottom, such that waste water that arrives at the support surface, when in use, flows toward the bottom.

A substantial aspect of the invention is that at least a portion of the support surface for supporting the cover element is designed such that it slopes toward the bottom. This means at least a portion of the support surface is tilted in relation to the horizontal when in use, such that water is drained, or run off, toward the bottom, and thus toward the opening in the outlet. One advantage is that waste water flows away from the support surface of the drain device in a technically simple, reliable and quick manner. This prevents waste water from accumulating, or remaining and evaporating, on the support surface, resulting in residue of the evaporated waste water accumulating on the support surface. As a result, cleaning work and cleaning costs are reduced. Furthermore, the reproduction of bacteria, which reproduce quickly in (warm) waste water, is prevented, or suppressed, on the drain device, because waste water does not remain (for any period of time) on the support surface.

In one embodiment, the upper rim surface is designed such that it slopes downward, at least in part, toward the bottom, such that waste water that reaches the upper rim surface, when in use, flows downward toward the bottom. As a result, waste water is largely prevented from accumulating or remaining on the upper rim surface. Furthermore, the development or accumulation of residue of evaporated water on the upper rim surface is largely prevented in a technically simple manner. As a result, keeping the drain device clean, or cleaning the drain device, is substantially simplified. This leads to reduced cleaning work and to lower cleaning costs. Moreover, the risk of slipping when a person steps on the drain device, or the upper rim surface, is reduced because the friction is increased by the reliable draining of waste water away from the upper rim surface. No waste water that could act as a slick film remains on the upper rim surface.

In another embodiment, at least a portion of the outer edges bordering on the support surface, in particular all of the outer edges bordering on the support surface, has a rounded design. As a result, waste water is drained even more reliably. Furthermore, waste water remaining on surfaces of the drain device is more reliably prevented. As a result, the formation and accumulation of residue of evaporated waste water on the drain device, or surfaces of the drain device, is inhibited to an even greater degree. Moreover, cleaning the support surface is facilitated.

At least a portion of the outer edges bordering on the bottom, in particular all of the outer edges bordering on the bottom, can have a rounded design. As a result, accumulating or persisting waste water on surfaces of the drain device can be more thoroughly prevented. In addition, the cleaning of the bottom is facilitated.

In another embodiment, at least a portion of the bottom is designed to slope downward toward the opening in the outlet. As a result, the draining of the water from the bottom into the opening of the outlet is supported and reliably ensured. This way, waste water remaining on portions of the bottom is more reliably prevented. This makes it harder for residue of evaporated water to remain on portions of the bottom. This reduces the cleaning work and lowers the cleaning costs.

All surfaces of the drain device that may come in contact with the waste water can be designed such that they slope downward toward the outlet. One advantage is that a drain device is designed in a technically simple manner, preventing waste water from accumulating and remaining on any surface of the drain device to a large degree. As a result, no residue of evaporated waste water is able to accumulate or form on surfaces of the drain device. As a result, the cleaning work and cleaning costs are significantly reduced. Furthermore, the cleaning of the surfaces is simplified. Moreover, bacteria reproduction is suppressed.

In another embodiment, the bottom has reinforced regions where the bottom is thicker in comparison to the regions of the bottom outside the reinforced regions. One advantage is that the bottom of the drain device is constructed to be particularly sturdy. As a result, the bottom does not warp, even for larger quantities of waste water. In this way, the functionality of the bottom, in particular the alignment of the bottom, in relation to the horizontal, when in use is ensured, even for larger quantities of waste water.

The longitudinal directions of the reinforced region can run substantially in the direction of the opening of the outlet. One advantage is that the reinforced region guides waste water more accurately toward the openings of the outlet. In doing so, waste water is even more strongly prevented from accumulating or remaining on portions of the drain device.

In another embodiment, the bottom comprises a plurality of bottom elements, which are tilted toward one another at an angle. One advantage is waste water that reaches the various bottom elements being reliably conveyed to the opening of the outlet.

In another embodiment, the bottom elements of the bottom are designed to slope downward toward the opening of the outlet. This ensures that no substantial quantities of waste water can remain on any of the bottom elements, and no residual dirt accumulates on the bottom elements due to evaporated waste water.

The drain device can be designed such that it is mirror symmetrical in relation to a mirror plane, which plane runs through the center point of the opening of the outlet, and is perpendicular to the connecting walls. As a result, the production of the drain device is technically simplified. This results in reduced production costs of the drain device. Furthermore, the installation of the drain device in the bottom is simplified, because the alignment of the drain device is arbitrary, i.e. the two longitudinal ends of the drain device can be arbitrarily exchanged with one another.

In another embodiment, at least a portion of the corners of the bottom has a rounded design. One advantage is that waste water is more reliably drained. Furthermore, the cleaning of the corners of the bottom is facilitated as a result.

Preferred embodiments can be derived from the dependent Claims. The invention shall be explained in greater detail below, based on drawings. Therein:

In the following description, the same reference numerals shall be used for identical and identically acting parts.

Figure 1:
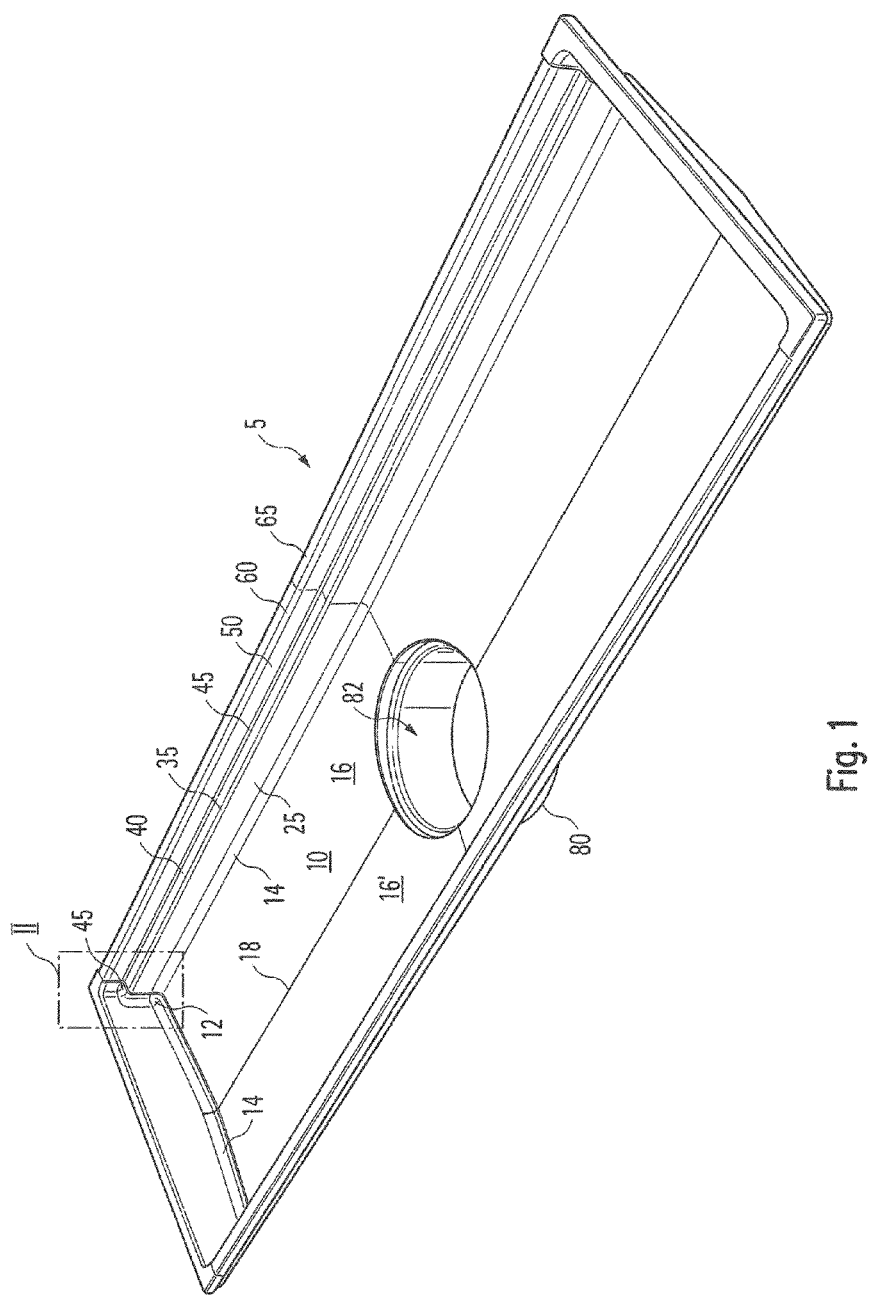
FIG. 1 shows a perspective X-ray view of a first embodiment of the drain device according to the invention.

FIG. 1 shows a perspective X-ray view of a first embodiment of the drain device 5 according to the invention. The drain device 5 is a drainage channel, for example, that is installed in a bottom, e.g. a tiled bottom. It is also conceivable, however, that the drain device 5 is a shower drain. The drain device 5 can also be a sewer element.

The drain device 5 comprises a bottom 10. Waste water accumulates on the bottom 10, and conveys waste water into an opening 82 of an outlet 80. The outlet 80 is used to connect the drain device 5 to a sewer pipe, or the sewer system.

Figure 2:
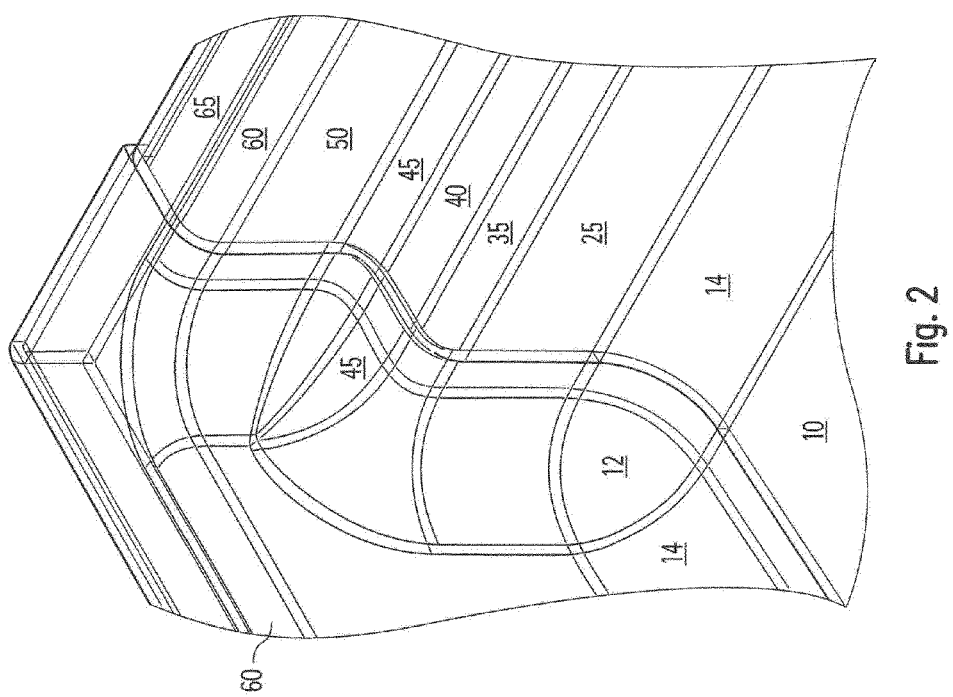
FIG. 2 shows a detail view of the region II of FIG. 1.

FIG. 2 shows a detail view of the region II of FIG. 1. The bottom 10 is bordered by outer edges 14 and corners 12. The outer edges 14 are rounded. The corners 12 likewise have a rounded design.

The drain device 5 comprises a support surface 40 on each of the two opposing longitudinal sides (in FIG. 1, upper right, or lower left). There is no support surface 40 on the short, or transverse sides (in FIG. 1, upper left, or lower right). It is also conceivable, however, that a support surface is also provided on the short sides.

The bottom 10 transitions into a connecting wall 25 (at the two longitudinal sides of the drain device 5), via rounded outer edges 14, and subsequently, via outer edges 35, which also have a rounded design, into an end surface 40. When in use, the connecting wall 25 is disposed such that this wall is substantially vertical. The bottom 10 thus transitions smoothly into the edges 14, subsequently into the connecting wall 25, and via the outer edges 35, into the support surface 40. The support surface 40 slopes downward toward the bottom 10, or the opening 82 of the outlet 80, i.e. the support surface 40 is designed such that it is (slightly) tilted in relation to the horizontal. As a result, the waste water flows reliably and quickly downward from the support surface 40. The water does not accumulate on the support surface 40, and substantially no waste water remains on the support surface 40.

The support surface 40 transitions smoothly into the upper outer edge 45 of the support surface 40 on the side facing away from the connecting wall 25. The upper outer edge 45 of the support surface 40 transitions smoothly, in turn, into a connecting wall 50 between the support surface 40 and an upper rim surface 65. Subsequently, the connecting wall 50 transitions smoothly into the rounded outer edge 60 of the upper rim surface 65. Lastly, the rounded outer edge 60 transitions smoothly into the upper rim surface 65. This means that the outer edges 65 have a rounded design. The connecting wall 50 between the support surface 40 and the upper rim surface 65 is substantially vertically aligned when in use. The upper rim surface 65 forms an outer circumference of the drain device 5.

Figure 6:
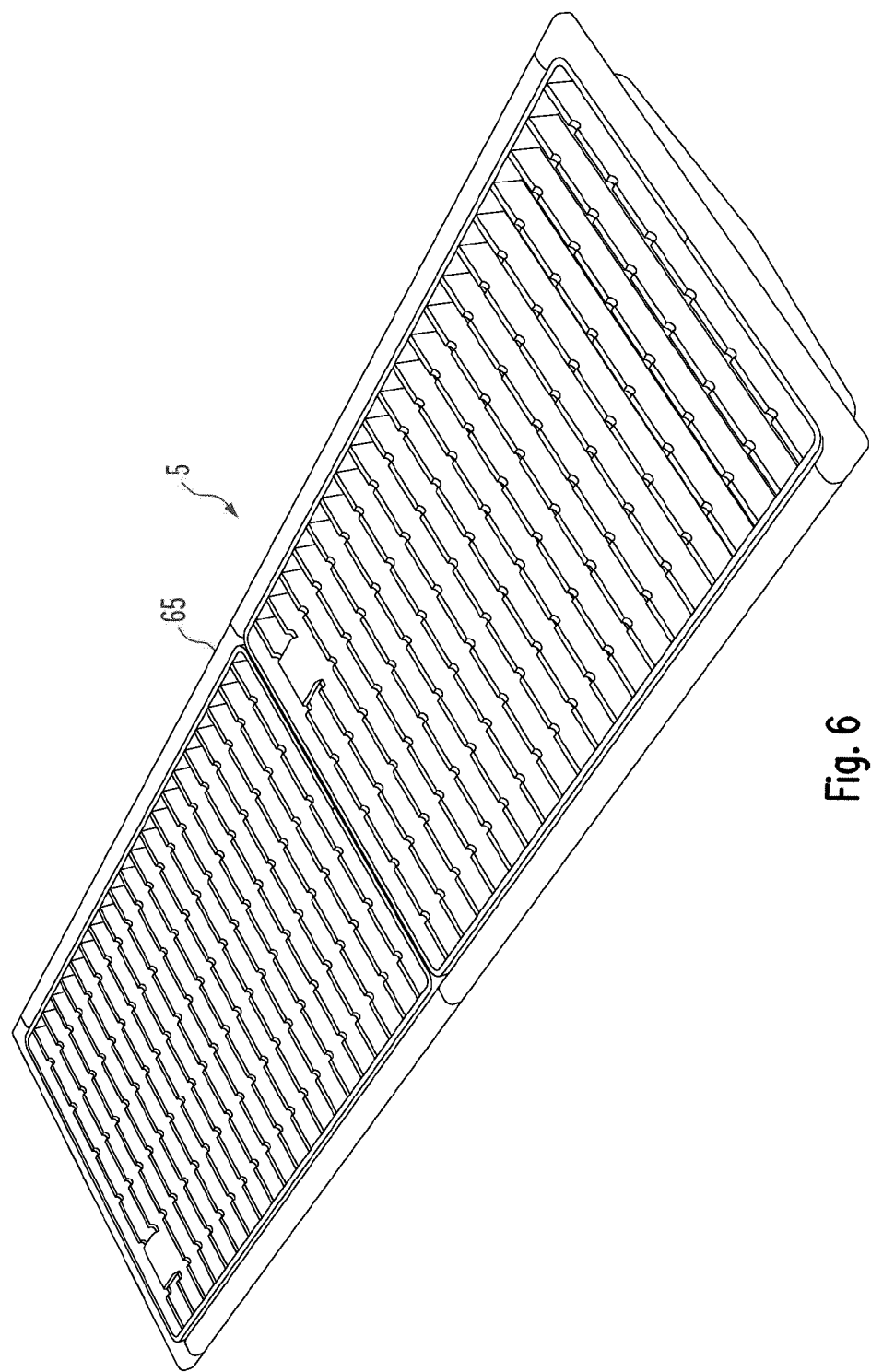
FIG. 6 shows a perspective view of the drain device shown in FIG. 1 having an example embodiment of a cover element covering the drain device.

The support surface 40 is used to support a cover element (shown in FIG. 6). The cover element covers the bottom 10 of the drain device 5. The cover element has a walk-on surface, which is substantially flush with the upper rim surface 65 when in use. When in use, the surface of the cover element runs substantially horizontally. The cover element can, in particular, be a cover grid, or a cover grate. Waste water passes through the cover element through slots in the cover element, into the interior of the drain device 5, or arrives at the bottom 10.

The upper rim surface 65 serves as a visible surface. This means that after inserting the cover element, and installing the drain device 5 in the bottom, normally only the upper rim surface 65 and the surface of the cover element are directly visible. As a matter of course, other parts of the drain device 5 are visible through the slots in the cover element.

The corners 12 of the bottom 10 also have a rounded design. As a result, there is a smooth transition between the outer edges 14 of the bottom 10 along the longitudinal side of the drain device 5 and the outer edges 14 of the bottom along the short, or transverse, sides of the drain device 5 in the corner regions. The edge 45 of the support surface 40 also has a rounded design in the corner regions.

It is also conceivable that, in each case, only a portion of the (outer) edges and/or corners have a rounded design.

In FIG. 1 and FIG. 2, the entire support surface 40 on both opposing longitudinal sides of the drain device 5 is designed to slope downward toward the bottom 10. The entire upper rim surface 65 (i.e. on both longitudinal sides and on both short, or transverse, sides of the drain device 5) is designed to slope downward toward the bottom 10 in FIG. 1 and in FIG. 2. It is also conceivable that, in each case, only a portion of the upper rim surface 65 and/or the support surface 40 is designed to slope downward toward the bottom 10, or the opening 82 of the outlet 80; by way of example, only the upper rim surface 65 at the two longitudinal sides, or at the two short, or transverse, sides. In the embodiment shown in FIG. 1 and FIG. 2, the entire upper rim surface 65, the entire support surface 40, as well as all of the corners 12 of the bottom 10, all edges 14 of the bottom 10, all (upper and lower) edges 35, 45 of the support surface 40, and the entire, (encompassing) edge 60 of the upper rim surface 65 are rounded, or designed to slope downward toward the bottom 10, or toward the opening 82 of the outlet 80. This applies to the corresponding elements on both longitudinal sides of the drain device 5. It is also conceivable that one or some of the aforementioned elements and/or only portions, or regions, of the specified elements, in each case, are rounded, or designed to slope downward toward the bottom 10.

The bottom 10 includes a plurality of bottom elements 16, 16'. The bottom elements 16, 16' are connected to one another via connecting edges 18. The bottom elements 16, 16' are tilted at an angle toward one another. This means that the bottom elements 16, 16' form an acute angle to one another, and when in use, to the horizontal. The bottom elements 16, 16' are furthermore designed to slope downward toward the opening 82 of the outlet 80. In the embodiment shown in FIG. 1, the bottom 10 comprises four essentially rectangular bottom elements 16, 16' having the same size. It is also conceivable that the bottom 10 has one single bottom element, two bottom elements, three bottom elements, or more than four bottom elements, such as five bottom elements, for example. Other shapes of the bottom elements, e.g. triangular, pentagonal, hexagonal, etc. are also conceivable.

The bottom 10 can have (in particular, linear) reinforced regions (not shown). The bottom has a greater thickness (measured vertically, when in use) in the reinforced regions than in the regions of the bottom 10 outside of the reinforced regions. The longitudinal directions (greatest extensions) of these (linear) reinforced regions can run substantially toward the opening 82 of the outlet 80.

Figure 3:
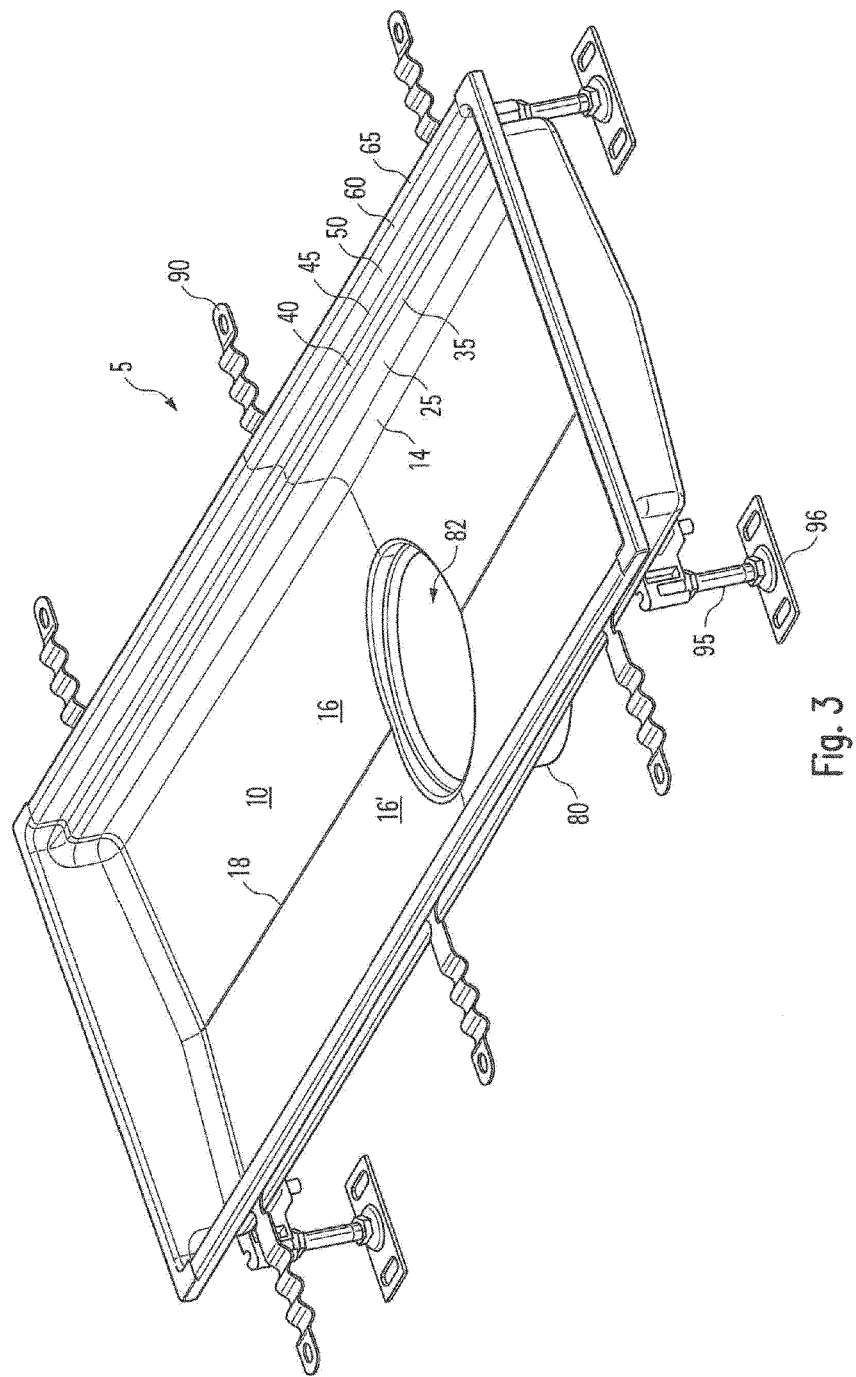
FIG. 3 shows a perspective X-ray view of another embodiment of the drain device according to the invention.
Figure 4:
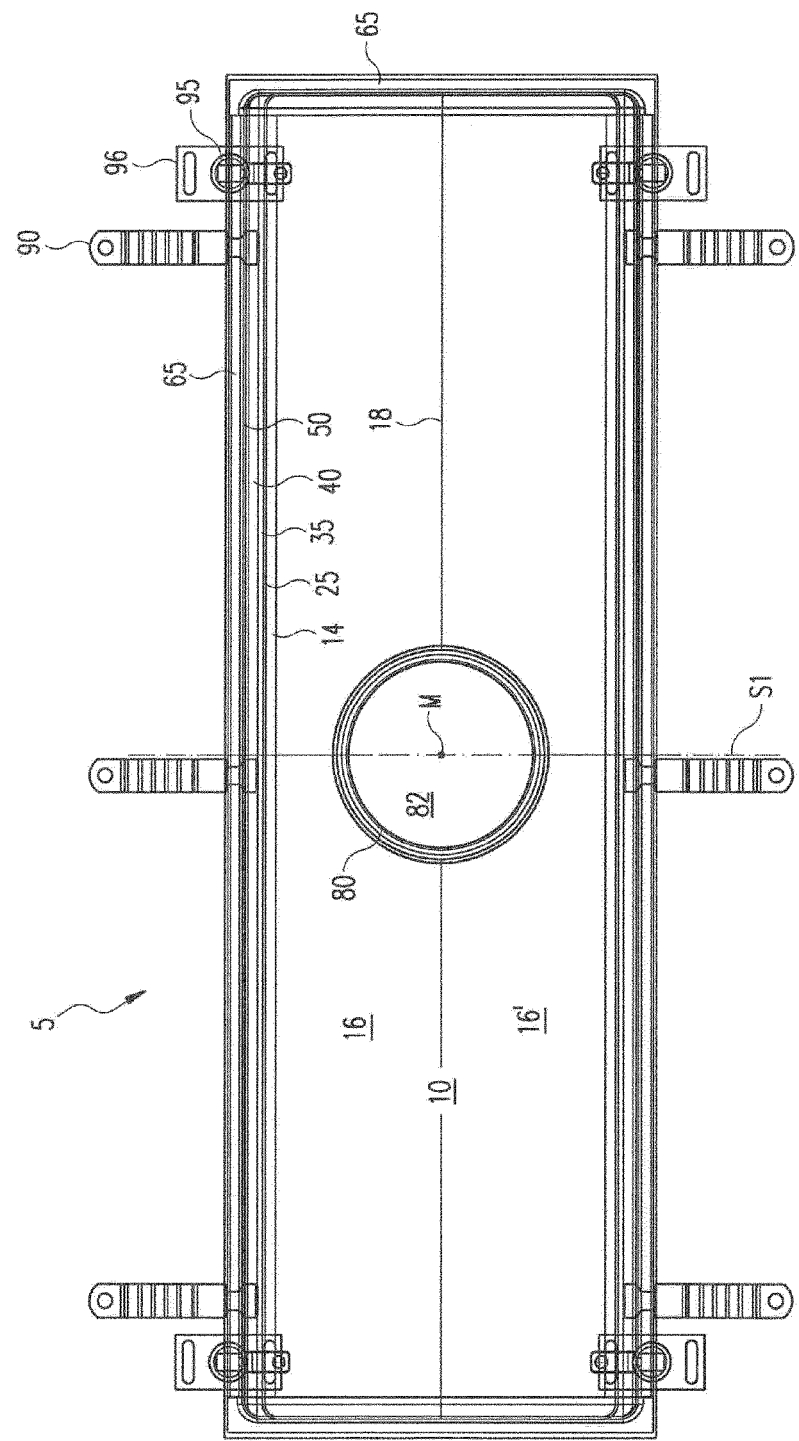
FIG. 4 shows an X-ray view of the drain device of FIG. 3.
Figure 5:
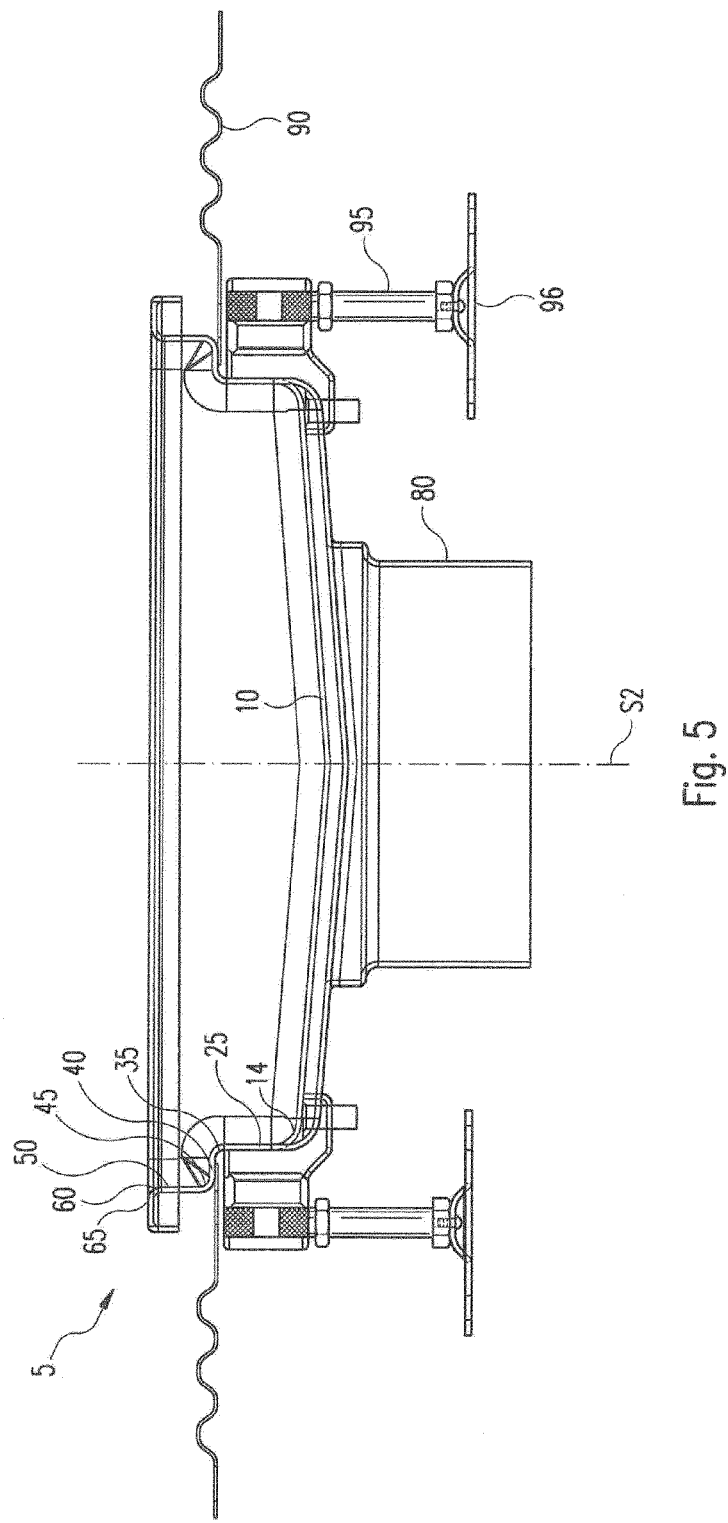
FIG. 5 shows a lateral X-ray view of the drain device of FIG. 3 and FIG. 4.

FIG. 3 shows a perspective X-ray view of another embodiment of the drain device 5 according to the invention. The embodiment shown in FIG. 3 differs from the first embodiment in FIG. 1 and FIG. 2 only in that the drain device 5 has additional fasteners 90, height adjustment elements 95, and feet 96 for the height adjustment elements 95. FIG. 4 shows an X-ray view from above of the drain device (in use) of FIG. 3. FIG. 5 shows a lateral X-ray view of the drain device 5 of FIGS. 3 and 4.

The drain device 5 of FIGS. 3 to 5 has fasteners 90. These fasteners 90 extend outward, substantially perpendicular to the connecting walls 25, 50, i.e. away from the outlet 80. The fasteners 90 serve to attach the drain device 5 into, or on, the bottom in which the drain device 5 is installed. The fastening can be effected, for example, by means of screws, bolts, rivets, adhesive or by means of other types of fasteners. The drain device 5 in FIG. 4 has six fasteners 90, which are spaced apart from one another at a uniform distance; three on each longitudinal side of the drain device 5. Other arrangements of the fasteners are conceivable, such as only two, three, four or five fasteners. A greater number than six fasteners, e.g. seven or eight fasteners is also conceivable.

The drain device 5 has a total of four height adjustment elements 95 at or close to its two opposing longitudinal ends (on the right and left in FIG. 4), each disposed at the two opposing longitudinal sides (top and bottom in FIG. 4). These height adjustment elements 95 can be screws, or threaded bolts with a nut, for example. The height adjustment elements 95 stand on feet 96, or are connected to feet 96. The height adjustment elements 95 serve to adjust the height of the respective region of the drain device 5. They serve to align the drain device 5 in relation to the bottom, or in relation to the horizontal. The height adjustment elements 95 are adjusted such that the opening 82 of the outlet 80 lies at the lowest point of the drain device 5. Furthermore, the drain device 5 is installed or aligned in the bottom, such that the connecting walls 25, 50 run substantially vertical. Moreover, it shall be checked during the installation that the angle of the support surface 40 to the horizontal at the two opposing longitudinal sides (on the left and right in FIG. 3, top and bottom in FIG. 4) as well as the angle of the upper rim surface 65 to the horizontal is substantially equal at all sides of the drain device 5.

The opening 82 of the outlet 80 has a round design. Other shapes are also conceivable, such as oval, elliptical, triangular, quadrangular, pentagonal, hexagonal, etc. It is also conceivable that there is more than one outlet, e.g. two outlets, having corresponding openings. The opening 82 of the outlet 80 is located in the bottom 10 of the drain device 5.

The drain device 5 can be designed to be mirror symmetrical in relation to a mirror plane S1, which plane runs through the center point M of the opening 82 of the outlet 80, and perpendicular to the connecting walls 25, 50. The embodiment shown in FIG. 4 exhibits this type of mirror symmetry, aside from the two central connecting elements 90.

The upper rim surface 65 serves as an outer circumference of the drain device 5. In FIG. 4 it is thus located on the left and the right, as well as at the top and the bottom. A support surface 40 is only located at the top and bottom in FIG. 4, while there is no support surface 40 at the right and left sides of the drain device in FIG. 4. It is also conceivable, however, that in this region (i.e. at the short transverse sides of the drain device 5) there is a portion of the support surface 40.

The cover element, or the contact surfaces of the cover element may be designed to be complementary to the support surface 40, such that an extensive surface contact between the cover element and the support surface 40 is obtained. A contact between the cover element and the support surface 40 via only a thin linear region is also conceivable. The cover element can be permanently attached to the support surface 40, or it can be designed as an integral part of the support surface 40. It is also conceivable that the cover element is a separate element, which can be (releasably) attached to the support surface 40, or the drain device 5, e.g. by means of screws, bolts, and/or adhesive.

It can be particularly readily seen in FIG. 5 that all of the surfaces 10, 40, 65 of the drain device 5 that are designed to come into contact with waste water, are designed such that they slope downward toward the bottom 10, or the opening of the outlet 80. Downward sloping means that the respective surfaces exhibit an angle to the horizontal that is in the range of greater than zero to less than 90 degrees.

The drain device 5 is furthermore designed to be mirror symmetrical to another mirror plane S2, which plane is perpendicular to the mirror plane S1. The mirror plane S1 runs through the center point M of the opening 82 of the outlet 82 [sic: 80] and is perpendicular to the longitudinal sides of the drain device 5 (left and right in FIG. 4).

The drain device 5 has a substantially rectangular outer shape. Other (outer) shapes, such as round, oval, elliptical, circular, triangular, quadrangular (not rectangular), pentagonal, hexagonal, etc., are conceivable.

The support surface 40 can exhibit an angle, in particular, of approx. 50° to the horizontal. When in use, the height difference between the surfaces of different regions of the bottom 10 is at least approx. 3 mm. The width of the bottom 10 is approx. 163 mm. The height of the drain device 5 is approx. 50 mm in its entirety. The spacing between the upper edges of the opposing support surfaces 40 is approx. 200 mm.

The connecting edges 18 between the bottom elements 16, 16' of the bottom 10 are aligned perpendicular to one another in each case (i.e. viewed from above). It is also conceivable that the connecting edges 18 have a shape that is similar to the letter "X" when viewed from above.

The radii of the various roundings of the different corners 12, or edges 14, 35, 45, 60 may be of equal size. It is also conceivable, however, that the radii of different corners 12 and edges 14, 35, 45, 60, or the corners 12 in comparison with the edges 14, 35, 45, 60, are of different sizes.

LIST OF REFERENCE SYMBOLS

5 drain device
10 bottom
12 corner of the bottom
14 outer edges of the bottom
16, 16' bottom element
18 connecting edge between bottom elements
25 connecting wall between bottom and support surface
35 outer edges between support surface and connecting wall between bottom and support surface
40 support surface
45 outer edges between support surface and connecting wall between support surface and upper rim surface
50 connecting wall between support surface and upper rim surface
60 edge of the upper rim surface
65 upper rim surface
80 outlet
82 (upper) opening of the outlet
90 fastener
95 height adjustment element
96 feet of the height adjustment element
M center point (M) of the opening of the outlet
S1 mirror plane 1
S2 mirror plane 2

The invention claimed is:

1. A drain device for the removal of waste water, having an upper rim surface, which forms a visible an outer circumference and perimeter of the drain device, a support surface for supporting a cover element such that its accessible surface is substantially flush with the upper rim surface forming a perimeter around the cover element, and a bottom for accumulating and conveying waste water into an opening of an outlet, the upper rim surface is connected to the support surface with a substantially vertical connecting wall and the support surface is connected to the bottom with a substantially vertical connecting wall, characterized in that the upper rim surface and at least a portion of the support surface is designed to slope downward toward the bottom, such that, when in use, incoming waste water at the upper rim surface and support surface flows toward the bottom.

2. The drain device of claim 1, characterized in that at least a portion of the outer edges bordering the support surface have a rounded design.

3. The drain device of claim 1, characterized in that at least a portion of the outer edges bordering the bottom have a rounded design.

4. The drain device of claim 1, characterized in that at least a portion of the bottom is designed to slope downward toward the opening of the outlet.

5. The drain device of claim 1, characterized in that all of the surfaces of the drain device slope downward toward the opening of the outlet.

6. The drain device of claim 1, characterized in that the bottom comprises bottom elements tilted at an angle toward one another.

7. The drain device of claim 6, characterized in that the bottom elements of the bottom slope downward toward the opening of the outlet.

8. The drain device of claim 1, characterized in that the drain device is designed to be mirror symmetrical in relation to a mirror plane, which plane extends through the center point of the opening of the outlet, and perpendicular to the connecting walls.

9. The drain device of claim 1, characterized in that at least a portion of the corners of the bottom has a rounded design.

10. The drain device of claim 1, characterized in that the upper rim surface is an outer perimeter that is a visible planar surface when the support surface is supporting the cover element.

\* \* \* \* \*